July 25, 1950  W. J. HARTWIG  2,516,207
DETENT FOR PARALLEL MOTION MECHANISM
Filed Sept. 17, 1948
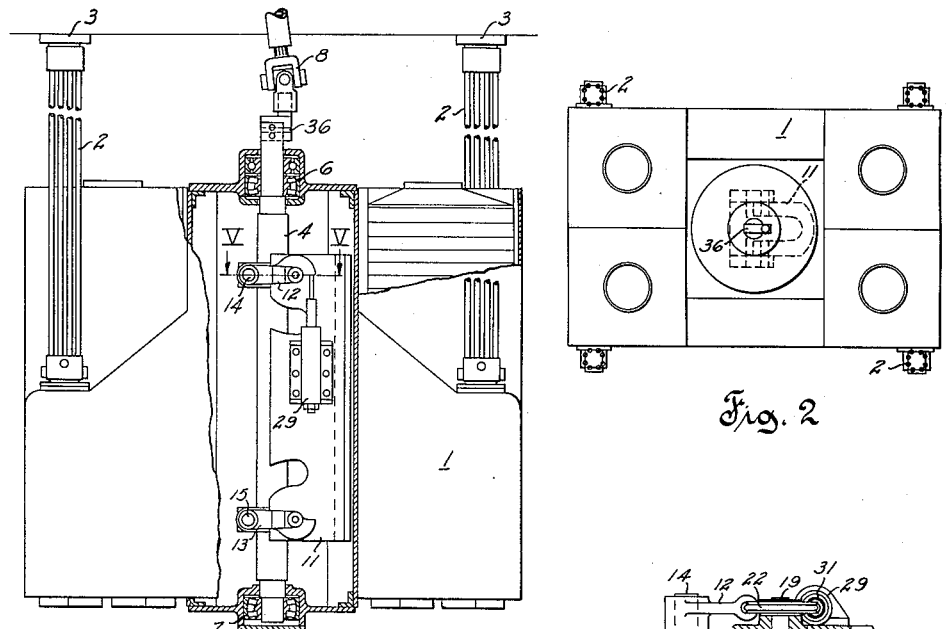
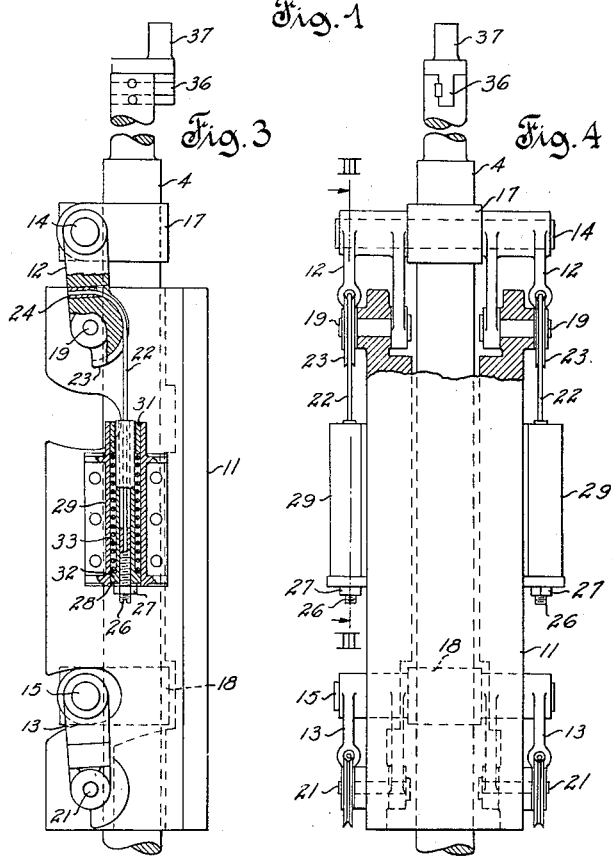
Inventor
Walter J. Hartwig
by William S. ____
Attorney Patented July 25, 1950

2,516,207

UNITED STATES PATENT OFFICE 2,516,207

DETENT FOR PARALLEL MOTION MECHANISM

Walter J. Hartwig, Milwaukee, Wis., assignor to Allis-Chalmers Manufacturing Company, Milwaukee, Wis., a corporation of Delaware Application September 17, 1948, Serial No. 49,727

5 Claims. (Cl. 74—527)

The present invention relates to an improved means for limiting motion in a parallel motion mechanism and is useful for example in limiting outward motion of a flyweight in an inertia mechanism for gyrating sifters.

A mechanism for gyrating sieves which involves a flyweight movable in parallel relation to its axis of revolution is disclosed in an application of one Eugene C. Cook, filed September 17, 1948, Ser. No. 49,703, now abandoned. The present invention concerns a novel means of controlling the action of the flyweight in such a device.

An object of the invention is to provide a simple device for adjustably limiting parallel motion of one element relative to another to which it is connected by a pair of equal parallel links.

Another object of the present invention is to provide a parallel motion linkage with a resilient biasing spring to variably resist and limit movement of the linkage.

The invention having the above and still further objects and advantages which may appear herein may be carried into practical effect as fully described hereinbelow with reference to the accompanying drawing, in which:

Fig. 1 is a side view of a gyratory sifter equipped with a mechanism according to the present invention and shown partially in vertical longitudinal section.

Fig. 2 is a top view of the device of Fig. 1 with the drive coupling removed and the supporting reeds shown in cross section.

Fig. 3 is a side view on an enlarged scale of the rotor of the device of Fig. 1, partly in section on the line III—III of Fig. 4.

Fig. 4 is a view taken from the right of Fig. 3 shown partly in section.

Fig. 5 is a partial section on the line V—V of Fig. 1, of only the rotor, shown on an enlarged scale.

For the purpose of illustrating utility the present invention is described as embodied in a novel gyratory sifter mechanism of the well known type in which a flyweight mounted on a shaft journaled in vertically aligned bearings is thrown radially outward to an unbalanced position by rotation of the shaft to cause gyration of the sifter by balanced inertia effects, the sifter being resiliently mounted or otherwise free to move in all directions in a horizontal plane.

In Fig. 1 the sifter box 1 is shown as suspended by resilient flexible reeds 2 from an overhead support 3. The inertia gyrating mechanism or rotor includes a shaft member 4 rotatably mounted and supported chiefly by vertically aligned bearings 6 and 7 connected rigidly with the sifter box, the axis of rotation passing substantially through the center of gravity of the box 1. The shaft 4 is rotated from any suitable driving source of rotary motion, through a universal power transmission coupling 8.

The gyrating mechanism, of the flyweight type, involves a flyweight member 11 of channel shape in cross section, capable of receiving the shaft 4 between the channel sides. This weight 11 is connected with the shaft 4 by a pair of (or, as shown, two pairs of) parallel links 12 and 13 of equal length between the centers of parallel pivot axes at their opposite ends. The connection between the links 12 and 13 and the shaft 4 is made as by pivot axes or bearing pins 14 and 15 carried by blocks 17 and 18 on the shaft 4, axes 14 and 15 being perpendicular to a common radial plane through the longitudinal axis of shaft 4. The connection between the links and the weight 11 is through pivot axes or bearing pins 19 and 21 mounted in parallel relation in the sides of the channel like weight member 11 and spaced in a direction parallel with the longitudinal mass axis of the weight, a distance equal to the spacing of pins 14 and 15 in a direction parallel to the longitudinal axis of shaft 4.

It will be seen that, in assembly, the shaft member 4, weight member 11 and links 12 and 13 constitute a simple quadrilateral parallel motion linkage, opposite sides of which remain parallel throughout all changes in the angles between adjacent sides, and that upon rotation of shaft 4, centrifugal force will act to throw weight 11 radially outward relative to shaft 4, whereupon links 12 and 13 constraining the weight to motion in parallelism with shaft 4 will modify the forces in such a manner that the weight 11 must move upward (axially of shaft 4) as it moves radially outward from the position as shown in Figs. 3 and 4. Thus, the weight of member 11 opposes its separation from shaft 4.

The present invention provides an advantageous means of selectively limiting the separation of weight 11 from shaft 4 in a radial direction, to a portion of the full maximum separation which would be achieved by allowing links 12 and 13 to assume a position approaching perpendicularity with the longitudinal axes of shaft 4 and weight 11. This is achieved by connecting one end of a flexible cable 22 with a link 12, and connecting the other end of such cable with weight 11, with a limited freedom of motion relative to a portion of the weight which changes its distance from the portion of the link to which the said one end of the cable is fastened, as a result of change in form of the linkage. This arrangement, suitably proportioned, will provide for a stopping of the outward motion of weight 11 relative to shaft 4, by cable 22, when motion of the cable relative to weight 11 as a result of angular movement of link 12 relative to the weight causes the said other end of the cable to reach the limit of its permitted motion relative to the weight. This will be more clearly understood from the full description of the preferred embodiment of the invention made hereinbelow.

In the preferred embodiment shown in the drawing that end of a link 12 which will be pivotally connected with weight 11 is given the form of a sector of a cylinder, with an arcuate surface 23 concentric with the axis of connecting pin 19 which joins link 12 with weight 11. Cable 22 has one end anchored by any suitable known means at 24 in link 12, its intermediate portion being engageable by surface 23. The opposite end of the cable 22 is adjustably secured, preferably through a threaded member 26 and adjusting nut 27, with a slider element 28 which is slidably movable in a rectilinear guide member 29 rigidly fixed to weight 11. Shoulder or abutment 31 on guide member 29 limits motion of slider 28 which has a shoulder 32 in opposed relation to abutment 31. A helical coil spring 33 of the compression resisting type is arranged between the slider shoulder 32 and the guide shoulder 31 in such a manner that when fully compressed (all coils abutting) it will cooperate with shoulders 31 and 32 to act as a positive stop or motion limiting device for the weight end of the cable 22.

It will be seen that if cable 22 is effectively shortened by adjustment of nut 27, the limit of radially outward and upward motion of weight 11 may be varied from zero to a maximum approaching ninety degrees along the arc described by its movement relative to shaft 4.

Adjustment of the effective length of cable 22 can of course be made at either or both ends, see means 24 which may be of the same character as threaded members 26—27. This adjustment will limit the effective moment of inertia of the weight 11 in its outer limiting position about the longitudinal axis of shaft 4.

When the mechanism is at rest, the center of mass of weight 11 will be close to but slightly eccentric relative to the longitudinal axis of shaft 4. Slow rotation of the shaft 4 in bearings 7, 8 will exert a centrifugal force tending to increase the distance between the center of mass of weight 11 and the axis of rotation of shaft 4 but this force will be resisted by gravity acting on weight 11 and links 12 and 13 and by the elastic stresses in spring 33. As the speed of shaft 4 increases, the centrifugal force will overcome the forces resisting motion of weight 11 and the weight will (at a predeterminable speed) fly out to a limiting position dependent upon the effective length of cable 22. This predetermined speed is chosen to have a value higher than the natural frequency of vibration of the sifter on its resilient suspension mounting. When the critical speed is passed, the weight 11, in its outer position, and the box 1, will gyrate about a common axis of gyration between the axis of bearings 7, 8 and the longitudinal axis of mass of weight 11, as is well known in the art.

It will be understood that the external surface of slider 28 may be calibrated (calibration not shown) so that adjustment of the means 24 or 26—27 will be readable against a suitable index (not shown) on guide 29, to give the radius of gyration of box 1 about the axis of gyration.

Coupling element 36 may be made adjustable so that the stub shaft 37 may have its central axis made eccentric to that of shaft 4 by an amount equal to the preselected radius of gyration. In this manner the universal coupling or joint 8 may be made to rotate on its central longitudinal axis during normal operation of the sifter.

Due to predetermination of the speed at which the weight 11 flies out, at a value higher than the critical or natural frequency, the rotor has a very slight unbalance at rest and during acceleration up to and through the critical speed, and can be readily accelerated through the critical speed at such a rate that substantially no undesirable plunging effects, due to resonance, will occur during starting up. On slowing down, the value of the eccentric weight moment while decelerating through critical speed will be low enough so that no excessive plunging will occur, due to resonance, on stopping.

Whereas a specific sifter mechanism has been described and illustrated, it will be understood that the invention to which this specification relates would find utility in the control of other devices involving parallel motion linkages, and includes such modifications and equivalents, within the scope of the appended claims, as might readily occur to persons skilled in the art to which this invention appertains.

It is claimed and desired to secure by Letters Patent:

1. In a parallel motion linkage the combination comprising a pair of relatively movable members joined by a pair of links of equal lengths, pivotally connected at their opposite ends to said members on equally spaced parallel pivot axes; an arcuate sector integral with one of said links and concentric with its pivotal connection with one of said members; a flexible cable secured at one end to said one of said links and flexed around the periphery of said arcuate sector; and resilient spring means connecting the opposite end of said cable with said one of said members and urging said opposite end of said cable tangentially away from said sector relative to said one of said members.

2. In a parallel motion linkage, the combination comprising a pair of relatively movable members joined by a pair of links of equal lengths, pivotally connected at their opposite ends to said members on equally spaced parallel pivot axes; an arcuate sector integral with one of said links and concentric with its pivotal connection with one of said members; a rectilinear guide on said one of said members, arranged tangentially of said sector; a slider operable in said guide; spring means resiliently connecting said slider and said guide in a manner to urge said slider tangentially away from said arcuate sector; and a flexible cable anchored at its opposite ends to said one of said links and said slider, and flexed around said sector intermediate its ends.

3. A centrifugally operable parallel motion flyweight mechanism comprising a rotatably mounted shaft member, a pair of links of equal lengths pivotally connected with said shaft at one end on parallel pivot axes spaced longitudinally of said shaft; a flyweight pivotally connected with the other ends of said links on parallel pivot axes spaced the same distance apart as the pivot axes on said shaft; an arcuate sector on one of said links and centered on that end thereof which is pivotally connected with said flyweight; a spring carried by said flyweight in tangential alignment with said arcuate sector; and a flexible cable secured at one end to said link and at its other end to said spring, with an intermediate portion of said cable flexed over said sector and with said spring resiliently urging said other end in a direction tangentially away from said sector, relative to said flyweight.

4. A centrifugally operable parallel motion flyweight mechanism comprising, a rotatably mounted shaft member, a pair of links of equal lengths, pivotally connected with said shaft at one end on parallel pivot axes spaced longitudinally of said shaft; a flyweight pivotally connected with the other ends of said pair of links, on parallel pivot axes, spaced the same distance apart as the pivot axes on said shaft; an arcuate sector on one of said links and centered on that end thereof which is pivotally connected with said flyweight; a guide on said flyweight arranged tangentially to said arcuate sector; a slider in said guide; spring means associated with said guide and slider to resiliently urge said slider in a direction away from said sector; and a flexible cable anchored at one end to said one of said links and at its other end to said slider, with a portion intermediate said ends flexed over said sector.

5. In a centrifugally operable flyweight mechanism a rotatable shaft member; a pair of links carried by said shaft member and pivotally connected therewith at one end on a pair of parallel pivot axes spaced longitudinally of said shaft; a flyweight pivotally connected with and carried by the other ends of said links on spaced parallel pivot axes; a spring means carried by said flyweight and operably connected with one of said links at a point eccentric to its pivotal connection with said weight and resiliently urging said link to rotate on said pivotal connection, relative to said flyweight, in a direction to move said flyweight closer to said shaft.

WALTER J. HARTWIG.

REFERENCES CITED

The following references are of record in the file of this patent:

UNITED STATES PATENTS

| Number | Name | Date |
|---|---|---|
| 733,936 | Barrett | July 21, 1903 |
| 897,957 | Bennett | Sept. 8, 1908 |
| 1,056,215 | Reynolds | Mar. 18, 1913 |
| 1,142,146 | Combs | June 8, 1915 |
| 1,256,612 | Terry | Feb. 19, 1918 |
| 1,567,551 | Stebbins | Dec. 29, 1925 |
| 2,178,122 | Ostler | Oct. 31, 1939 |
| 2,226,188 | Wittel | Dec. 24, 1940 |
| 2,274,937 | Raulerson | Mar. 3, 1942 |